US011901101B2

(12) United States Patent
Nakamura

(10) Patent No.: US 11,901,101 B2
(45) Date of Patent: Feb. 13, 2024

(54) INSULATING MATERIAL-COATED SOFT MAGNETIC POWDER, DUST CORE, MAGNETIC ELEMENT, ELECTRONIC DEVICE, AND MOVING BODY

(71) Applicant: Seiko Epson Corporation, Tokyo (JP)

(72) Inventor: Atsushi Nakamura, Hachinohe (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/745,912

(22) Filed: May 17, 2022

(65) Prior Publication Data
US 2022/0375664 A1 Nov. 24, 2022

(30) Foreign Application Priority Data
May 18, 2021 (JP) ................. 2021-084093

(51) Int. Cl.
*H01F 1/147* (2006.01)
*H01F 1/24* (2006.01)
(Continued)

(52) U.S. Cl.
CPC ................ *H01F 1/147* (2013.01); *B22F 1/00* (2013.01); *B22F 1/05* (2022.01); *B22F 1/052* (2022.01);
(Continued)

(58) Field of Classification Search
CPC ................ G11B 5/66; Y10T 428/2991; Y10T 428/12014; Y10T 428/12035; Y10T 428/12181; Y10T 428/12618; Y10T 428/1259; Y10T 428/12611; Y10T 428/12951; Y10T 428/32; C22C 2202/02; C22C 33/0257; C22C 38/02; C22C 1/1084; C22C 1/08; B22F 1/16; B22F 1/05; B22F 1/00; B22F 1/142; B22F 2304/10; B22F 2303/01; B22F 2998/10; B22F 2301/35; B22F 2009/0828; B22F 3/02; B22F 3/10;
(Continued)

(56) References Cited

U.S. PATENT DOCUMENTS

2016/0125987 A1   5/2016  Moon et al.
2018/0204657 A1*  7/2018  Shinkai ................. B22F 3/24
(Continued)

FOREIGN PATENT DOCUMENTS

JP   2009-188270 A   8/2009
JP   2014-201831 A  10/2014
JP   2016-092403 A   5/2016

*Primary Examiner* — Michael E. La Villa
(74) *Attorney, Agent, or Firm* — Harness, Dickey & Pierce, P.L.C.

(57) ABSTRACT

An insulating material-coated soft magnetic powder includes: a core particle that includes a base portion containing a soft magnetic material containing Fe as a main component and at least one of Si, Cr, and Al, and that includes an oxide film provided on a surface of the base portion and containing an oxide of at least one of Si, Cr, and Al; and an insulating film that is provided on a surface of the core particle and that contains a ceramic, in which a thickness of the insulating film is 5 nm or more and 300 nm or less, and the oxide contained in the oxide film and the ceramic contained in the insulating film are mutually diffused at an interface between the oxide film and the insulating film.

10 Claims, 10 Drawing Sheets

(51) Int. Cl.
| | |
|---|---|
| B22F 1/16 | (2022.01) |
| C22C 38/02 | (2006.01) |
| G11B 5/66 | (2006.01) |
| C22C 1/08 | (2006.01) |
| C22C 1/10 | (2023.01) |
| C22C 33/02 | (2006.01) |
| H01F 1/20 | (2006.01) |
| H01F 1/28 | (2006.01) |
| H01F 17/06 | (2006.01) |
| H01F 27/28 | (2006.01) |
| B22F 3/02 | (2006.01) |
| H01F 27/24 | (2006.01) |
| H01F 1/33 | (2006.01) |
| B22F 1/142 | (2022.01) |
| B22F 1/00 | (2022.01) |
| B22F 9/08 | (2006.01) |
| B22F 1/05 | (2022.01) |
| B22F 3/10 | (2006.01) |
| B22F 1/052 | (2022.01) |
| H01F 3/08 | (2006.01) |
| H01F 1/18 | (2006.01) |
| H01F 27/255 | (2006.01) |
| H01F 17/04 | (2006.01) |
| B22F 9/04 | (2006.01) |

(52) U.S. Cl.
CPC ............... *B22F 1/142* (2022.01); *B22F 1/16* (2022.01); *B22F 3/02* (2013.01); *B22F 3/10* (2013.01); *B22F 9/08* (2013.01); *B22F 9/082* (2013.01); *C22C 1/08* (2013.01); *C22C 1/1084* (2013.01); *C22C 33/0257* (2013.01); *C22C 38/02* (2013.01); *G11B 5/66* (2013.01); *H01F 1/1475* (2013.01); *H01F 1/14766* (2013.01); *H01F 1/18* (2013.01); *H01F 1/20* (2013.01); *H01F 1/24* (2013.01); *H01F 1/28* (2013.01); *H01F 1/33* (2013.01); *H01F 3/08* (2013.01); *H01F 17/062* (2013.01); *H01F 27/24* (2013.01); *H01F 27/2823* (2013.01); *B22F 2009/043* (2013.01); *B22F 2009/0828* (2013.01); *B22F 2201/013* (2013.01); *B22F 2201/016* (2013.01); *B22F 2201/02* (2013.01); *B22F 2201/11* (2013.01); *B22F 2301/35* (2013.01); *B22F 2302/25* (2013.01); *B22F 2303/01* (2013.01); *B22F 2304/10* (2013.01); *B22F 2998/10* (2013.01); *B22F 2999/00* (2013.01); *C22C 2202/02* (2013.01); *H01F 27/255* (2013.01); *H01F 2017/048* (2013.01); *Y10T 428/12014* (2015.01); *Y10T 428/12035* (2015.01); *Y10T 428/1259* (2015.01); *Y10T 428/12181* (2015.01); *Y10T 428/12611* (2015.01); *Y10T 428/12618* (2015.01); *Y10T 428/12951* (2015.01); *Y10T 428/2991* (2015.01); *Y10T 428/32* (2015.01)

(58) Field of Classification Search
CPC .............. B22F 2999/00; B22F 2302/25; B22F 2201/11; B22F 2201/016; B22F 2201/02; B22F 2201/013; B22F 9/082; B22F 1/052; B22F 2009/043; B22F 9/08; H01F 27/255; H01F 27/2823; H01F 27/24; H01F 2017/048; H01F 3/08; H01F 1/18
See application file for complete search history.

(56) References Cited

U.S. PATENT DOCUMENTS

2019/0333666 A1* 10/2019 Nakamura ........... H01F 1/14766
2020/0279676 A1* 9/2020 Orimo ..................... C22C 38/06

* cited by examiner

INSULATING MATERIAL-COATED SOFT MAGNETIC POWDER, DUST CORE, MAGNETIC ELEMENT, ELECTRONIC DEVICE, AND MOVING BODY

The present application is based on, and claims priority from JP Application Serial Number 2021-084093, filed May 18, 2021, the disclosure of which is hereby incorporated by reference herein in its entirety.

BACKGROUND

1. Technical Field

The present disclosure relates to an insulating material-coated soft magnetic powder, a dust core, a magnetic element, an electronic device, and a moving body.

2. Related Art

JP-A-2009-188270 discloses a soft magnetic particle powder having an insulating layer on a particle surface, in which the insulating layer is made of oxide fine particles of aluminum or the like. In addition, JP-A-2009-188270 further discloses that an average particle diameter of the oxide fine particles is less than 100 nm. By providing the insulating layer on a surface of metal particles, a specific resistance is less likely to decrease even when the metal particles are fired at a high temperature, and thus a high-performance dust core is obtained.

In addition, JP-A-2009-188270 discloses, as a method for producing such a soft magnetic particle powder, a method of forming an insulating layer on the surface of the metal particles by premixing a metal particle powder and oxide fine particles and then applying mechanical energy including compression and shearing force.

Further, JP-A-2009-188270 discloses that strain is removed by annealing the soft magnetic particle powder at a high temperature.

When the mechanical energy including compression and shearing force is applied to the metal particles, strain (stress) increases inside the metal particles. Accordingly, the coercive force of the metal particles increases. As a result, there is a problem that magnetic properties of the soft magnetic particle powder deteriorate.

In addition, the strain can be reduced by annealing, but the coercive force increased by the increase of the strain cannot be sufficiently reduced. Further, in the method of forming an insulating layer disclosed in JP-A-2009-188270, a film thickness of the insulating layer tends to be uneven. Therefore, an insulating property of the insulating layer tends to be insufficient. When the film thickness of the insulating layer is uneven, the annealing temperature cannot be sufficiently increased, and an annealing effect cannot be sufficiently achieved.

SUMMARY

An insulating material-coated soft magnetic powder according to an application example of the present disclosure includes: a core particle that includes a base portion containing a soft magnetic material containing Fe as a main component and at least one of Si, Cr, and Al, and that includes an oxide film provided on a surface of the base portion and containing an oxide of at least one of Si, Cr, and Al; and an insulating film that is provided on a surface of the core particle and that contains a ceramic, in which a thickness of the insulating film is 5 nm or more and 300 nm or less, and the oxide contained in the oxide film and the ceramic contained in the insulating film are diffused to each other at an interface between the oxide film and the insulating film.

A dust core according to an application example of the present disclosure contains: the insulating material-coated soft magnetic powder according to the application example of the present disclosure.

A magnetic element according to an application example of the present disclosure includes: the dust core according to the application example of the present disclosure.

An electronic device according to an application example of the present disclosure includes: the magnetic element according to the application example of the present disclosure.

A moving body according to an application example of the present disclosure includes: the magnetic element according to the application example of the present disclosure.

DESCRIPTION OF EXEMPLARY EMBODIMENTS

Hereinafter, an insulating material-coated soft magnetic powder, a dust core, a magnetic element, an electronic device, and a moving body according to the present disclosure will be described in detail based on preferred embodiments shown in the accompanying drawings.

1. Insulating Material-Coated Soft Magnetic Powder

First, an insulating material-coated soft magnetic powder according to an embodiment will be described.

Figure 1:
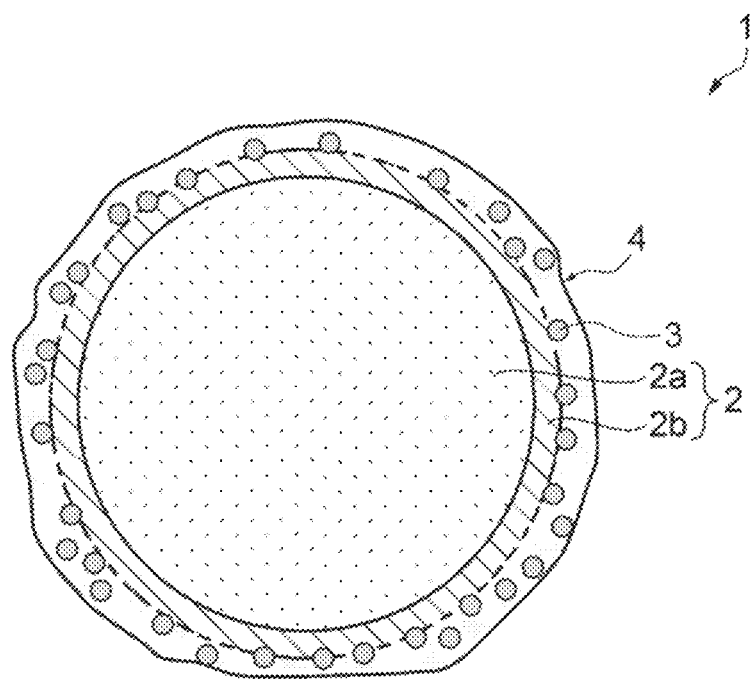
FIG. 1 is a cross-sectional view schematically showing one particle of an insulating material-coated soft magnetic powder according to an embodiment.

FIG. 1 is a cross-sectional view schematically showing one particle of the insulating material-coated soft magnetic powder according to the embodiment. In the following description, one particle of the insulating material-coated soft magnetic powder is also referred to as an "insulating material-coated soft magnetic particle".

An insulating material-coated soft magnetic particle 1 shown in FIG. 1 includes a core particle 2 and an insulating film 4 provided on a surface of the core particle 2. Here, the core particle 2 includes a base portion 2a and an oxide film 2b. The base portion 2a contains a soft magnetic material described below. The oxide film 2b is provided on a surface of the base portion 2a and contains an oxide of an element contained in the soft magnetic material. The insulating film 4 is provided on the surface of the core particle 2, contains a ceramic, and has an insulating property.

The oxide contained in the oxide film 2b and the ceramic contained in the insulating film 4 are mutually diffused at an interface between the oxide film 2b and the insulating film 4. With such mutual diffusion, adhesion of the insulating film 4 to the core particle 2 increases. As a result, even when the obtained insulating material-coated soft magnetic particle 1 is subjected to a heat treatment at a high temperature, the insulating property of the insulating film 4 is not impaired, and sintering is also suppressed. Accordingly, the insulating material-coated soft magnetic particle 1 has a low coercive force and a high insulation resistance value between particles.

When a plurality of such insulating material-coated soft magnetic particles 1 are gathered to form a dust core, the insulating property between the particles is increased. Accordingly, an eddy current loss can be reduced in a magnetic element including the dust core. As a result, it contributes to the realization of a magnetic element having a low loss (core loss) in a high frequency band.

A shape of the insulating material-coated soft magnetic particle 1 is not limited to a substantially spherical shape, and may be, for example, an irregular shape having a plurality of protrusions on the surface. An average particle diameter of the insulating material-coated soft magnetic particle 1 is preferably 1.0 µm or more and 50.0 µm or less, more preferably 2.0 µm or more and 30.0 µm or less, and still more preferably 3.0 µm or more and 15.0 µm or less. Accordingly, in the dust core produced from the insulating material-coated soft magnetic particle 1, the eddy current loss can be reduced and magnetic properties such as a magnetic permeability and a magnetic flux density are improved.

The average particle diameter in the present description refers to a particle diameter when a cumulative volume in a volume-based particle size distribution is 50%. The particle size distribution is obtained by a dynamic light scattering method or a laser diffracted light method described in JIS Z 8825:2013. Specifically, for example, a particle size distribution meter using the dynamic light scattering method as a measurement principle can be adopted.

1.1. Core Particle

As described above, the core particle 2 includes the base portion 2a and the oxide film 2b.

1.1.1. Base Portion

The soft magnetic material contained in the base portion 2a contains Fe as a main component and at least one of Si, Cr, and Al as a subcomponent. The soft magnetic material may contain any element in addition to the main component and the subcomponent.

Specific examples of the soft magnetic material include, in addition to Fe—Si-based alloys such as silicon steel and Fe—Si—Al-based alloys such as Sendust, various alloys such as Fe—Si—B-based, Fe—Si—B—C-based, Fe—Si—B—Cr—C-based, Fe—Si—Cr-based, Fe—Cr—Al-based, Fe—Co—Si—B-based, and Fe—Si—B—Nb-based alloys.

By using the soft magnetic material having such compositions, an insulating material-coated soft magnetic particle 1 having a high magnetic permeability, magnetic flux density, and the like and a low coercive force is obtained. By producing the core particle 2 using such a soft magnetic material, the oxide film 2b can be efficiently and uniformly formed.

The content of Fe in the soft magnetic material is preferably 50 mass % or more, more preferably 70 mass % or more, and still more preferably 80 mass % or more in terms of mass ratio. Accordingly, the magnetic properties of the insulating material-coated soft magnetic particle 1, such as the magnetic permeability and the magnetic flux density, are improved.

A crystallinity of the soft magnetic material is not particularly limited, and may be any one of crystalline, amorphous (non-crystalline), and microcrystalline (nano-crystalline). Among these, the soft magnetic material preferably contains an amorphous or microcrystalline material. By containing the amorphous or microcrystalline material, the coercive force is reduced, which also contributes to a decrease in hysteresis loss of the insulating material-coated soft magnetic particle 1. Materials having different crystallinities may be mixed in the soft magnetic material.

In the base portion 2a, the soft magnetic material is the main material, and in addition to the main material, impurities may be contained. The main material refers to a material that accounts for 50% or more of the base portion 2a in terms of mass ratio. The content of the soft magnetic material in the base portion 2a is preferably 80 mass % or more, and more preferably 90 mass % or more. Accordingly, the base portion 2a exhibits a good soft magnetic property.

In addition to the soft magnetic material, any additive may be added to the base portion 2a. Examples of such an additive include various metal materials, various non-metal materials, and various metal oxide materials.

1.1.2. Oxide Film

The oxide film 2b of the core particle 2 contains an oxide of an element derived from the soft magnetic material contained in the base portion 2a. For example, when the soft magnetic material is an Fe—Si—Cr-based alloy, the oxide film 2b contains one or more of iron oxide, chromium oxide, and silicon oxide. When the Fe—Si—Cr-based alloy contains an element other than the main elements Fe, Cr and Si, the oxide film 2b may contain oxides of the other elements.

Depending on the soft magnetic material to be used, examples of the oxide contained in the oxide film 2b include iron oxide, chromium oxide, nickel oxide, cobalt oxide, manganese oxide, silicon oxide, boron oxide, phosphorus oxide, aluminum oxide, magnesium oxide, calcium oxide, zinc oxide, titanium oxide, vanadium oxide, and cerium oxide. The oxide film 2b may contain one or more of these oxides.

Since these oxides have low conductivity, insulation resistance on the surface of the core particle 2 itself increases. Therefore, when the insulating material-coated soft magnetic particle 1 is applied to a dust core, the eddy current loss is reduced by the oxide film 2b in addition to the insulating property of the insulating film 4.

In addition, the oxide film 2b preferably contains a glass-forming component or a glass-stabilizing component. Accordingly, an interaction occurs between the oxide contained in the oxide film 2b and the ceramic contained in the insulating film 4. As a result, adhesion of the insulating film 4 to the oxide film 2b is promoted. Specifically, vitrification can occur between the glass-forming component or the glass-stabilizing component contained in the oxide film 2b and the ceramic. Accordingly, the oxide film 2b and the insulating film 4 strongly adhere to each other. Therefore, the insulating film 4 is less likely to peel off from the surface of the core particle 2. As a result, the coverage and heat resistance of the insulating film 4 can be improved.

With the vitrification or other actions described above, the oxide contained in the oxide film 2b and the ceramic contained in the insulating film 4 are mutually diffused at the interface between the oxide film 2b and the insulating film 4. Accordingly, the oxide film 2b and the insulating film 4 tend to be integrated with each other. As a result, for example, even when the insulating material-coated soft magnetic particle 1 is placed in an environment where high and low temperatures are repeated, a gap is less likely to occur between the core particle 2 and the insulating film 4. In addition, intrusion of moisture and the like into the gap is prevented and the insulating property is maintained. That is, resistance of the insulating material-coated soft magnetic particle 1 against a temperature change is improved.

Examples of the glass-forming component include silicon oxide, boron oxide, chromium oxide, and phosphorus oxide. Examples of the glass-stabilizing component include aluminum oxide. Among these, the oxide film 2b more preferably contains at least one of silicon oxide, aluminum oxide, and chromium oxide.

A type of the oxide contained in the oxide film 2b can be identified by, for example, X-ray photoelectron spectroscopy.

Presence or absence of the oxide film 2b in the core particle 2 can be identified based on a concentration distribution of oxygen atoms in a direction from the surface of the core particle 2 toward a center thereof, in other words, in a depth direction of the core particle 2. Specifically, the concentration distribution of the oxygen atoms in the depth direction of the core particle 2 can be obtained, and the presence or absence of the oxide film 2b can be known based on the concentration distribution. In the following description, a concentration of the oxygen atoms is also simply referred to as an oxygen concentration.

The above concentration distribution can be obtained by, for example, a depth direction analysis by Auger electron spectroscopy combined with sputtering. Specifically, the surface of the core particle 2 is irradiated with an electron beam, and Auger electrons are emitted from a surface layer of the core particle 2. Based on a kinetic energy of the Auger electrons, atoms present on the surface layer of the core particle 2 are qualified and quantified. This operation is repeated while causing ions to collide with the surface of the core particle 2 by sputtering, and gradually peeling off an atomic layer on the surface of the core particle 2. Then, by converting a time required for the sputtering into a thickness of the atomic layer peeled off by sputtering, a relation between the depth from the surface of the core particle 2 and a composition ratio can be known.

Here, a position where the depth from the surface of the core particle 2 is 300 nm is considered to be sufficiently deep from the surface. Therefore, the oxygen concentration at this position can be considered to be an oxygen concentration inside the core particle 2, that is, the base portion 2a. Therefore, a thickness of the oxide film 2b can be identified by calculating a relative amount with respect to the oxygen concentration in the base portion 2a based on a distribution of the oxygen concentration in the depth direction from the surface of the core particle 2.

Specifically, when the oxygen concentration calculated at a certain depth position of the core particle 2 is in a range within ±50% of the oxygen concentration in the base portion 2a, it is considered that the oxide film 2b does not present at this depth position. In contrast, when the calculated oxygen concentration exceeds +50% of the oxygen concentration in the base portion 2a, it is considered that the oxide film 2b is present. By repeating such evaluation, the thickness of the oxide film 2b can be known.

The thickness of the oxide film 2b in the core particle 2 is preferably 5 nm or more and 200 nm or less, and more preferably 10 nm or more and 100 nm or less. Accordingly, the insulating property of the core particle 2 itself is improved. At the same time, since a ratio of the oxide film 2b to the core particle 2 is reduced, a decrease in density as a magnetic body in the core particle 2 can be prevented. In addition, adhesion strength between the oxide film 2b and the insulating film 4 is further increased.

The core particle 2 may be a particle produced by any method. Examples of the production method include, in addition to various atomization methods such as a water atomization method, a gas atomization method, and a rotary water flow atomization method, a reduction method, a carbonyl method, and a pulverization method. Among these, particles produced by the atomization methods are preferably used as the core particle 2. According to the atomization methods, a fine powder having a uniform particle diameter can be efficiently produced. In addition, since powdering is performed by contact between a molten metal and water in the water atomization method or the rotary water flow atomization method, the oxide film 2b having an appropriate thickness is easily formed on the surface of the core particle 2.

The thickness of the oxide film 2b is adjusted according to conditions in a process of producing the core particle 2, for example, a cooling rate of the molten metal. Specifically, when the cooling rate is slowed down, the thickness of the oxide film 2b is thicker.

The oxide film 2b preferably covers the entire surface of the base portion 2a, or may have a discontinuous portion.

A particle diameter of the core particle 2 is adjusted according to an amount of the molten metal dropped per unit time, a pressure and a flow rate of water that is a spray medium, and the like in the process of producing the core particle 2. A classification treatment may be performed in order to adjust the average particle diameter of the core particle 2.

1.2. Insulating Film

The insulating film 4 covers at least a part of the surface of the core particle 2, and contains a ceramic.

Examples of the ceramic include boron oxide, aluminum oxide, magnesium oxide, titanium oxide, zirconium oxide, silicon oxide, iron oxide, potassium oxide, sodium oxide, calcium oxide, chromium oxide, boron nitride, silicon nitride and silicon carbide, and one or two or more of the above are used.

Among these, the ceramic preferably contains at least one of aluminum oxide, silicon oxide, zirconium oxide, boron nitride, and silicon nitride. Since these ceramics have a relatively high hardness and melting point, a hardness and a melting point of the insulating film 4 are also increased. Therefore, the shape is less likely to change with respect to a compressive load at the time of compact molding, and the decrease in insulating property of the insulating film 4 is prevented, so that the insulating material-coated soft magnetic particle 1 that can be molded at a high pressure can be produced. Since the heat resistance of the insulating film 4 is improved, the insulating property of the insulating film 4 is less likely to decrease even when the insulating film 4 is subjected to a heat treatment at a high temperature, and sintering or aggregation is less likely to occur.

The ceramic preferably has a relatively high hardness. Specifically, a Mohs hardness of the ceramic is preferably 6.0 or more, and more preferably 6.5 or more and 9.5 or less. Accordingly, when the insulating material-coated soft magnetic particle 1 is subjected to compact molding, deformation of the insulating film 4 is particularly less likely to occur. Therefore, the insulating property between the particles is less likely to decrease even after the compact molding, and compact molding at a high pressure can be performed. The compact molding at a high pressure contributes to the improvement of the magnetic properties of the dust core.

Ceramics having a Mohs hardness within the above range generally have a high melting point, and thus the ceramics have relatively high heat resistance. Therefore, even when a high-temperature heat treatment is performed, deformation due to heat is less likely to occur.

The insulating film 4 covers at least a part of the surface of the core particle 2. A thickness of the insulating film 4 is 5 nm or more and 300 nm or less, preferably 5 nm or more and 250 nm or less, and more preferably 10 nm or more and 200 nm or less. Accordingly, the insulating property of the insulating film 4 and a filling rate of the soft magnetic material in the dust core can be further improved. When the thickness of the insulating film 4 is less than the above lower limit value, the insulating property and the heat resistance of the insulating film 4 become insufficient. Meanwhile, when the thickness of the insulating film 4 is more than the above upper limit value, the insulating film 4 is likely to be peeled off, or the filling rate of the soft magnetic material at the time of compaction decreases.

The thickness of the insulating film 4 is measured by, for example, observing a cross section of the insulating material-coated soft magnetic particle 1 in an enlarged manner. Specifically, the insulating material-coated soft magnetic particle 1 is cut with a focused ion beam to produce a thin cross-sectional sample. Next, the obtained thin cross-sectional sample is observed with a scanning transmission electron microscope, and the thickness of the insulating film 4 is measured. In addition, an integrated state of the oxide film 2b and the insulating film 4 can also be confirmed by observation.

The thickness of the insulating film 4 is adjusted according to conditions such as an amount of the ceramic attached to the core particle 2 and the temperature and time in the heat treatment in the process of producing the insulating material-coated soft magnetic particle 1.

The insulating film 4 may contain nanoparticles 3 as necessary. Accordingly, the nanoparticles 3 are generated by, for example, raw materials remaining in the process of producing the insulating film 4, and the nanoparticles 3 may be contained in the insulating film 4. Accordingly, since the thickness of the insulating film 4 is easily secured, the insulating property and the heat resistance of the insulating film 4 are easily increased. Even when the nanoparticles 3 are contained, properties, such as the insulating property and the heat resistance, of the insulating film 4 are not decreased. It is not essential that the insulating film 4 contains the nanoparticles 3, and the insulating film 4 may not contain the nanoparticles 3. That is, the nanoparticles 3 may be melted or sintered in the production process, and the shape of the nanoparticles may be lost.

The nanoparticles 3 contain the above ceramic as a main material. The main material refers to a material that accounts for 50% or more of the nanoparticles 3 in terms of mass ratio. The content of the ceramic in the nanoparticles 3 is preferably 80 mass % or more, and more preferably 90 mass % or more.

An average particle diameter of the nanoparticles 3 is preferably 1 nm or more and 500 nm or less, more preferably 5 nm or more and 300 nm or less, and still more preferably 8 nm or more and 100 nm or less. When such an average particle diameter is set, even when the insulating film 4 contains the nanoparticles 3, the insulating property and the heat resistance are less likely to decrease. It is possible to avoid an excessive increase in thickness of the insulating film 4.

The average particle diameter of the nanoparticles 3 is also measured in the same manner as the thickness of the insulating film 4.

A particle diameter of each nanoparticle 3 is $1/50000$ or more and $1/100$ or less, preferably $1/30000$ or more and $1/300$ or less, and more preferably $1/10000$ or more and $1/500$ or less with respect to the particle diameter of the core particle 2.

When the particle diameter of the nanoparticle 3 is within the above range with respect to the particle diameter of the core particle 2, a gap is less likely to occur between the nanoparticle 3 and the core particle 2, and the thickness of the insulating film 4 can be made relatively thin. Accordingly, the insulating property of the insulating material-coated soft magnetic particle 1 can be secured, and a filling density of the soft magnetic material in the dust core can be further increased.

1.3. Other Forming Materials

The insulating material-coated soft magnetic particle 1 may contain a material having an insulating property other than the ceramic, in addition to the above materials. Examples of such a material include a glass material and a silicon material. Among these, examples of components contained in the glass material include $Bi_2O_3$, $B_2O_3$, $SiO_2$, $Al_2O_3$, ZnO, SnO, $P_2O_5$, PbO, $Li_2O$, $Na_2O$, $K_2O$, MgO, CaO, SrO, BaO, $Gd_2O_3$, $Y_2O_3$, $La_2O_3$, and $Yb_2O_3$, and one or more of the components are adopted.

Such other forming materials may be contained in the insulating film 4, and in this case, the content thereof is preferably 50 mass % or less, and more preferably 30 mass % or less of the ceramic. Accordingly, the insulating property of the insulating film 4 can be further increased.

As described above, the insulating material-coated soft magnetic powder according to the present embodiment includes the core particle 2 and the insulating film 4. The core particle 2 includes the base portion 2a and the oxide film 2b. The base portion 2a contains a soft magnetic material containing Fe as a main component and at least one of Si, Cr, and Al. The oxide film 2b is provided on the surface of the base portion 2a and contains an oxide of at least one of Si, Cr, and Al. The insulating film 4 is provided on the surface of the core particle 2, and contains a ceramic.

The thickness of the insulating film 4 is 5 nm or more and 300 nm or less. In addition, the oxide contained in the oxide film 2b and the ceramic contained in the insulating film 4 are mutually diffused at the interface between the oxide film 2b and the insulating film 4.

According to such a configuration, the insulating material-coated soft magnetic particle 1 is obtained in which the insulating film 4 having an appropriate thickness and a high insulating property and heat resistance is satisfactorily adhered to the core particle 2. Such an insulating material-coated soft magnetic particle 1 is less likely to be sintered or the insulating film 4 is less likely to be deteriorated, so that the insulating material-coated soft magnetic particle 1 can be subjected to a heat treatment at a high temperature. Therefore, the insulating material-coated soft magnetic particle 1 having a low coercive force and a high insulation resistance value between particles can be produced.

Since the insulating film 4 contains the ceramic, the insulating film 4 exhibits a sufficient insulation resistance value even when the thickness is thin. Therefore, when the insulating material-coated soft magnetic particle 1 is subjected to compaction, the filling rate of the soft magnetic material can be easily increased, and a magnetic element having good magnetic permeability and magnetic flux density can be produced.

The insulating film 4 may contain the nanoparticles 3 as insulating particles containing the ceramic as a main material. By containing the nanoparticles 3, the thickness of the insulating film 4 can be easily secured. Accordingly, the insulation property and the heat resistance of the insulating film 4 can be further increased.

1.4. Characteristics of Insulating Material-coated Soft Magnetic Powder

When S [m²/g] is a specific surface area of the insulating material-coated soft magnetic powder, ρ [g/m³] is a true density of the core particle 2, and d [m] is the average particle diameter of the insulating material-coated soft magnetic powder, the insulating material-coated soft magnetic powder preferably satisfies relations represented by the following expressions (A) and (B).

$$S = k\{6/(d \cdot \rho)\} \quad (A)$$

$$1.0 \leq k \leq 3.2 \quad (B)$$

When a specific surface area of a true spherical particle calculated based on the average particle diameter d and the true density p of the core particle 2 is used as a reference, the insulating material-coated soft magnetic powder having the specific surface area S within the above range has a sufficiently low specific surface area S. That is, k in the expression (A) corresponds to a multiple indicating how many times the specific surface area S of the insulating material-coated soft magnetic powder is the specific surface area of the true spherical particle, which indicates that the closer the multiple is to 1.0, the lower the specific surface area S is. When k satisfies the relation in the expression (B), the insulating material-coated soft magnetic powder is excellent in uniformity of the film thickness of the insulating film 4, and is excellent in filling property at the time of compaction. Therefore, by using the insulating material-coated soft magnetic powder, the magnetic element that is excellent in magnetic properties such as magnetic permeability and magnetic flux density and that is excellent in insulating property between particles is obtained.

In the expression (B), k is preferably 1.5 or more and 3.0 or less, and more preferably 2.0 or more and 2.9 or less. When the value of k is within the above range, an insulating material-coated soft magnetic powder that achieves the above effects and that is excellent in production stability can be produced.

The specific surface area S of the insulating material-coated soft magnetic powder is measured using a BET specific surface area measuring device HM1201-010 manufactured by MOUNTECH Co., Ltd. An amount of a sample is 5 g.

The coercive force of the insulating material-coated soft magnetic powder is preferably 7.0 [Oe] (557 [A/m]) or less, and more preferably 1.5 [Oe] (119 [A/m]) or more and 5.0 [Oe] (398 [A/m]) or less. By using the insulating material-coated soft magnetic powder having such a low coercive force, it is possible to produce a magnetic element capable of sufficiently reducing a hysteresis loss even when the magnetic element is used in a high frequency band.

The coercive force of the soft magnetic powder can be measured by, for example, a magnetization measuring device TM-VSM1230-MHHL manufactured by TAMAKAWA CO., LTD.

A specific volume resistance of the insulating material-coated soft magnetic powder when filled in a container, that is, a specific resistance is preferably 1 MΩ·cm or more, more preferably 5 MΩ·cm or more and 1000 GΩ·cm or less, and still more preferably 10 MΩ·cm or more and 500 GΩ·cm or less.

When the specific resistance is within the above range, the insulating property between the particles in the insulating material-coated soft magnetic powder is secured, and a use amount of an additional insulating material is reduced. Therefore, when the insulating material-coated soft magnetic powder is used for the dust core, a content of the insulating material-coated soft magnetic powder in the dust core can be increased, and both magnetic properties and lower loss can be achieved. In addition, a dielectric breakdown voltage of the dust core can be increased. The specific resistance of the insulating material-coated soft magnetic powder can be measured by the following procedure.

An alumina cylinder is filled with 1 g of the insulating material-coated soft magnetic powder, and brass electrodes are disposed at both ends of the cylinder. Then, while pressurizing between the electrodes at both ends of the cylinder with a load of 20 kgf by using a digital force gauge, electrical resistance between the electrodes at both ends of the cylinder is measured by using a digital multimeter. At this time, a distance between the electrodes at both ends of the cylinder is also measured.

Next, the measured distance between the electrodes during pressurization, the measured electrical resistance, and a cross-sectional area inside the cylinder are substituted into the following expression (C) to calculate the specific resistance.

Specific resistance [MΩ·m]=electrical resistance [MΩ]×cross-sectional area inside cylinder [cm²]/distance between electrodes during pressurization [cm]   (C)

The cross-sectional area inside the cylinder is equal to $\pi r^2$ [cm$^2$] when an inner diameter of the cylinder is 2r [cm]. The inner diameter of the cylinder is not particularly limited, and is, for example, 0.8 cm. The distance between the electrodes during the pressurization is not particularly limited, and is, for example, 0.425 cm.

2. Method for Producing Insulating Material-Coated Soft Magnetic Powder

Next, an example of a method for producing the above insulating material-coated soft magnetic powder will be described.

The method for producing the insulating material-coated soft magnetic powder includes a preparing step of preparing the core particle 2 and the nanoparticles 3, a coating step of adhering the nanoparticles 3 to the surface of the core particle 2, and a heat treating step of performing a heat treatment on the core particle 2 to which the nanoparticles 3 adhere. Hereinafter, each step will be described.

In the preparing step, the core particle 2 and the nanoparticles 3 that are raw materials are prepared.

In the coating step, the nanoparticles 3 are pressured to the surface of the core particle 2 using a dry mixer or grinder. Examples of the mixer or grinder include various grinders such as a hammer mill, a disc mill, a roller mill, a ball mill, a planetary mill, and a jet mill, various container vibration type stirrers, various friction mixers such as Ang Mill®, a high-speed elliptical mixer, mix muller®, a Jacobson mill, MECHANO FUSION®, and Hybridization®, and various rotary and revolutionary mixers. Processing is performed by adjusting energy at the time of the processing to reduce occurrence of a processing strain of the core particle 2 due to a mechanical damage. In order to prevent the processing strain as much as possible, a container vibration type or container rotation type mill or stirrer is particularly desirable in the above device.

In the mixer or stirrer, a ball medium may be used in addition to target raw materials. A diameter of the ball medium is not particularly limited, and is preferably 40 mm or less, more preferably 0.3 mm or more and 10 mm or less, and still more preferably 0.5 mm or more and 5.0 mm or less. By setting the diameter of the ball medium within the above range, the processing strain can be sufficiently prevented and the nanoparticles 3 can be efficiently pressured to the surface of the core particle 2. The use of the ball medium may be omitted.

When the container vibration type device is used, a frequency of the container vibration type device is not particularly limited, and is preferably 10 Hz or more and 100 Hz or less, and more preferably 20 Hz or more and 80 Hz or less. Accordingly, the raw materials can be effectively resonated.

An addition amount of the nanoparticles 3 with respect to the core particle 2 is preferably 0.1 mass % or more and 5.0 mass % or less, and more preferably 0.1 mass % or more and 1.0 mass % or less. Accordingly, the insulating film 4 having the above thickness can be formed.

The coating step performed by the above device is a dry coating method that is different from a wet coating method using a solution or the like. Therefore, the step can be performed in a dry atmosphere or an inert gas atmosphere, and intervention of moisture and the like between the core particle 2 and the nanoparticles 3 is prevented to improve long-term durability of the insulating material-coated soft magnetic particle 1.

The nanoparticles 3 may be subjected to a surface treatment as a pretreatment of the coating step. Examples of the surface treatment include a hydrophobic treatment. By subjecting the nanoparticles 3 to the hydrophobic treatment, adsorption of moisture on the nanoparticles 3 is prevented. Therefore, occurrence of deterioration or the like of the core particle 2 due to moisture can be prevented. The hydrophobic treatment can further prevent occurrence of aggregation in the insulating material-coated soft magnetic powder.

Examples of the above hydrophobic treatment include trimethylsilylation, and arylation such as phenylation. In the trimethylsilylation, for example, a trimethylsilylating agent such as trimethylchlorosilane is used. In the arylation, for example, an arylating agent such as an aryl halide is used.

Figure 2:
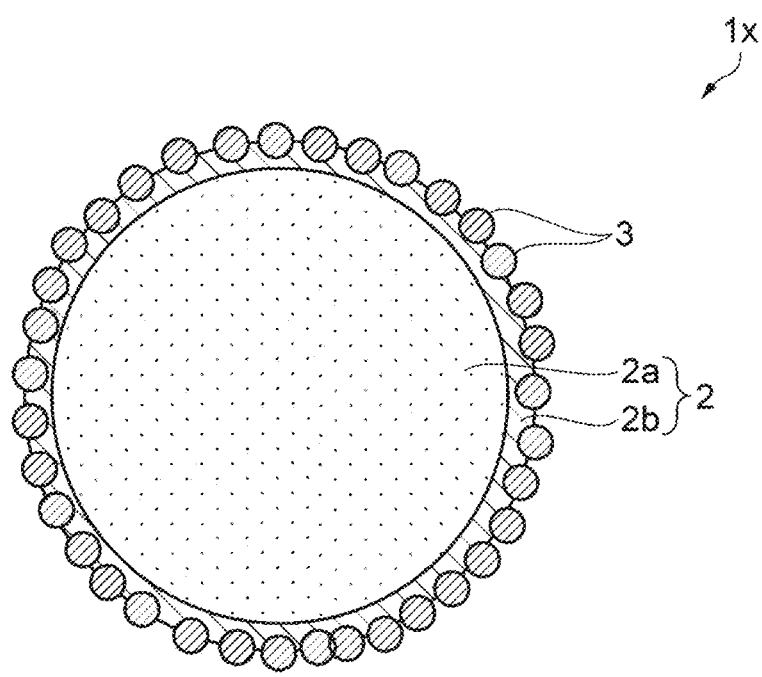
FIG. 2 is a cross-sectional view schematically showing one particle of the insulating material-coated soft magnetic powder after a coating step.

FIG. 2 is a cross-sectional view schematically showing one particle of the insulating material-coated soft magnetic powder after the coating step.

After the coating step, as shown in FIG. 2, an insulating material-coated soft magnetic particle 1x before a heat treatment, in which the nanoparticles 3 are adhered to a surface of the oxide film 2b in the core particle 2, is produced. In the insulating material-coated soft magnetic particle 1x before the heat treatment as shown in FIG. 2, the nanoparticles 3 that are embedded in the oxide film 2b and the nanoparticles 3 that are adhered to the surface of the oxide film 2b are present. The present state of the nanoparticles 3 with respect to the oxide film 2b is not limited to the above. For example, all nanoparticles 3 may be embedded in the oxide film 2b, or all nanoparticles 3 may not be embedded in the oxide film 2b, and may be adhered to the surface of the oxide film 2b.

In the heat treatment step, the heat treatment is performed on the insulating material-coated soft magnetic particle 1x before the heat treatment. With the heat treatment, a strain remaining on the insulating material-coated soft magnetic particle 1x before the heat treatment is removed. Accordingly, the insulating material-coated soft magnetic particle 1 having a low coercive force can be obtained. At least a part of the nanoparticles 3 may be melted or sintered by the heat treatment.

A heating temperature in the heat treatment is not particularly limited, and is preferably 600° C. or higher and 1200° C. or lower, and more preferably 900° C. or higher and 1100° C. or lower. A time for performing the heat treatment, that is, a time for holding the heating temperature is not particularly limited, and is preferably 10 minutes or longer and 10 hours or shorter, and more preferably 20 minutes or longer and 6 hours or shorter. By setting the heat treatment conditions within the above ranges, the strain can be removed and the insulating film 4 can be steadily formed in a short time as compared with a case where the heat treatment conditions are outside the above ranges.

An atmosphere in the heat treatment is not particularly limited, and examples thereof include an oxidizing gas atmosphere containing oxygen gas or air, a reducing gas atmosphere containing hydrogen gas or ammonia decomposition gas, an inert gas atmosphere containing nitrogen gas or argon gas, and a decompression atmosphere with any decompressed gas. Among these, the reducing gas atmosphere or the inert gas atmosphere is preferably used, and the decompression atmosphere is more preferably used. With these atmospheres, a heat treatment, that is an annealing treatment, can be performed with an increase in thickness of the oxide film 2b of the core particle 2 being prevented. Therefore, the insulating material-coated soft magnetic particle 1 having good magnetic properties and a high coverage of the insulating film 4 on the core particle 2 is obtained.

A device used for the heat treatment is not particularly limited as long as the above processing conditions can be set, and a known electric furnace or the like can be adopted.

In this way, the insulating material-coated soft magnetic powder is produced.

3. Dust Core and Magnetic Element

Next, a dust core and a magnetic element according to the embodiment will be described.

The magnetic element according to the embodiment can be applied as various magnetic elements including a magnetic core, such as a choke coil, an inductor, a noise filter, a reactor, a transformer, a motor, an actuator, an electromagnetic valve, and an electric generator. In addition, the dust core according to the embodiment can be applied to a magnetic core included in these magnetic elements.

Hereinafter, two kinds of coil components will be representatively described as an example of the magnetic element.

3.1. Toroidal Type

First, a toroidal type coil component, which is an example of the magnetic element according to the embodiment, will be described.

Figure 3:
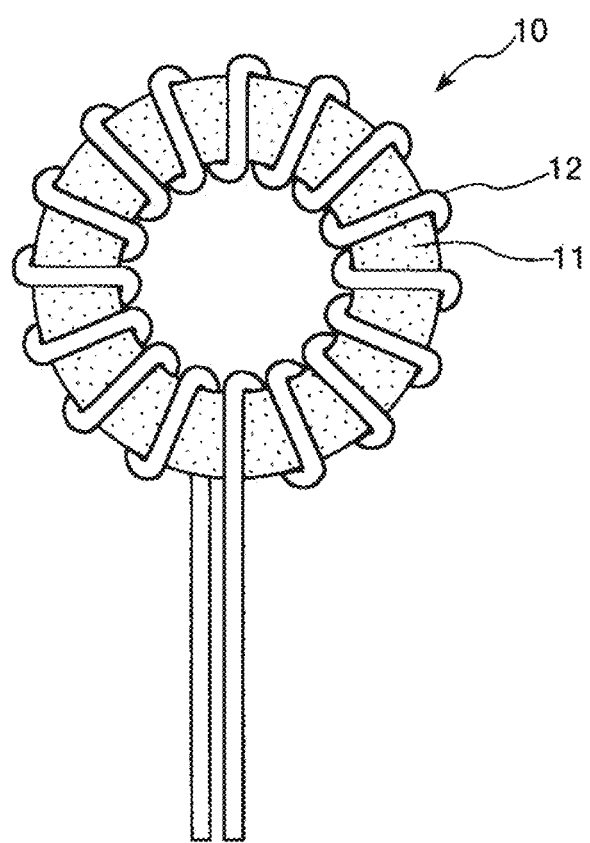
FIG. 3 is a plan view schematically showing a toroidal type coil component.

FIG. 3 is a plan view schematically showing the toroidal type coil component.

A coil component 10 shown in FIG. 3 includes a ring-shaped dust core 11 and a conductive wire 12 wound around the dust core 11. Such a coil component 10 is generally referred to as a toroidal coil.

The dust core 11 is obtained by mixing the insulating material-coated soft magnetic powder according to the embodiment and a binder, supplying the obtained mixture to a mold, and pressing and molding the mixture. That is, the dust core 11 is a compact containing the insulating material-coated soft magnetic powder according to the embodiment. The coil component 10 including such a dust core 11 has a low core loss and high magnetic properties such as magnetic permeability and magnetic flux density. As a result, when the coil component is mounted on an electronic device or the like, it is possible to reduce power consumption of the electronic device or the like and achieve high performance and miniaturization of the electronic device or the like.

The binder may be added as necessary, or may be omitted.

Examples of a constituent material of the binder used in the production of the dust core 11 include organic materials such as silicone-based resins, epoxy-based resins, phenol-based resins, polyamide-based resins, polyimide-based resins, and polyphenylene sulfide-based resins, and inorganic materials such as phosphates such as magnesium phosphate, calcium phosphate, zinc phosphate, manganese phosphate, and cadmium phosphate, and silicates such as sodium silicate. In particular, the constituent material is preferably a thermosetting polyimide or an epoxy-based resin. These resin materials are easily cured by heating and have excellent heat resistance. Therefore, the easiness of production and the heat resistance of the dust core 11 can be improved.

In addition, a ratio of the binder to the insulating material-coated soft magnetic powder slightly varies depending on target magnetic properties and mechanical properties of the dust core 11 to be produced, the acceptable eddy current loss, and the like, and is preferably about 0.5 mass % or more and 5 mass % or less, and more preferably about 1 mass % or more and 3 mass % or less. Accordingly, it is possible to obtain the coil component 10 having excellent magnetic properties while sufficiently binding the particles of the insulating material-coated soft magnetic powder to each other.

Various additives may be added to the mixture as necessary for any purpose.

Examples of a constituent material of the conductive wire 12 include a material having high conductivity, for example, a metal material including Cu, Al, Ag, Au, and Ni. An insulating film is provided on a surface of the conductive wire 12 as necessary.

A shape of the dust core 11 is not limited to the ring shape shown in FIG. 3, and may be, for example, a shape in which a part of the ring is missing, or a shape in which the shape in a longitudinal direction is linear.

In addition, the dust core 11 may contain a soft magnetic powder or a non-magnetic powder other than the above insulating material-coated soft magnetic powder according to the embodiment as necessary.

As described above, the coil component 10, which is a magnetic element, includes the dust core 11 containing the above insulating material-coated soft magnetic powder. Accordingly, the coil component 10 having a low core loss and excellent magnetic properties can be produced.

3.2. Closed Magnetic Circuit Type

Next, a closed magnetic circuit type coil component, which is an example of the magnetic element according to the embodiment, will be described.

Figure 4:
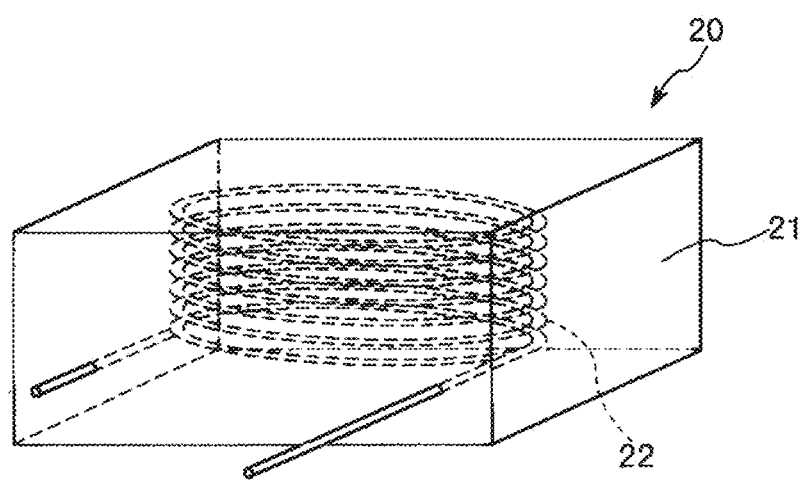
FIG. 4 is a transparent perspective view schematically showing a closed magnetic circuit type coil component.

FIG. 4 is a transparent perspective view schematically showing the closed magnetic circuit type coil component.

Hereinafter, the closed magnetic circuit type coil component will be described, and in the following description, differences from the toroidal type coil component will be mainly described, and descriptions of the same matters will be omitted.

As shown in FIG. 4, a coil component 20 according to the present embodiment is formed by embedding a conductive wire 22 formed in a coil shape in a dust core 21. That is, the coil component 20 that is a magnetic element includes the dust core 21 containing the above insulating material-coated soft magnetic powder, and is formed by molding the conductive wire 22 with the dust core 21. The dust core 21 has the same configuration as that of the above dust core 11. Accordingly, the coil component 20 having a low core loss and excellent magnetic properties can be produced.

The coil component 20 in such a form can be easily obtained in a relatively small size. In addition, the coil component 20 has high magnetic properties and a low core loss. As a result, when the coil component 20 is mounted on an electronic device or the like, it is possible to reduce power consumption of the electronic device or the like and achieve high performance and miniaturization of the electronic device or the like.

Since the conductive wire 22 is embedded in the dust core 21, a gap is less likely to occur between the conductive wire 22 and the dust core 21. Therefore, vibration due to magnetostriction of the dust core 21 can be prevented, and generation of noise due to the vibration can also be prevented.

The dust core 21 may contain a soft magnetic powder or a non-magnetic powder other than the above insulating material-coated soft magnetic powder according to the embodiment as necessary.

4. Electronic Device

Next, an electronic device including the magnetic element according to the embodiment will be described with reference to FIGS. 5 to 7.

Figure 5:
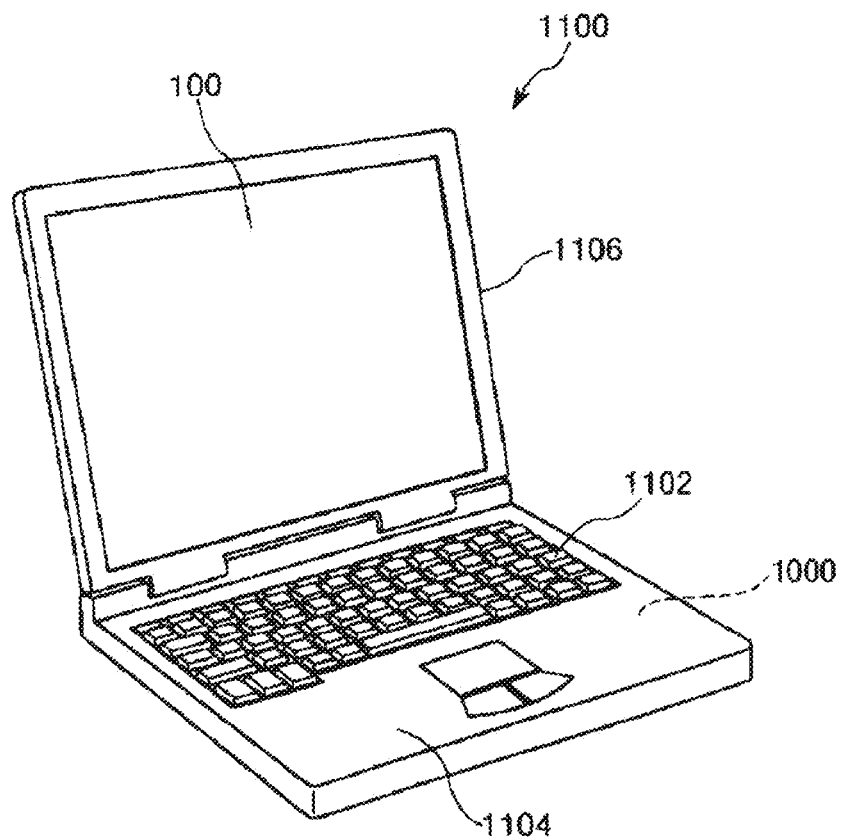
FIG. 5 is a perspective view showing a mobile personal computer, which is an electronic device including a magnetic element according to the embodiment.

FIG. 5 is a perspective view showing a mobile personal computer, which is an electronic device including the magnetic element according to the embodiment. A personal computer 1100 shown in FIG. 5 includes a main body 1104 including a keyboard 1102 and a display unit 1106 including a display portion 100. The display unit 1106 is rotatably supported by the main body 1104 via a hinge structure. Such a personal computer 1100 is incorporated with a magnetic element 1000 such as a choke coil for a switching power supply, an inductor, and a motor.

Figure 6:
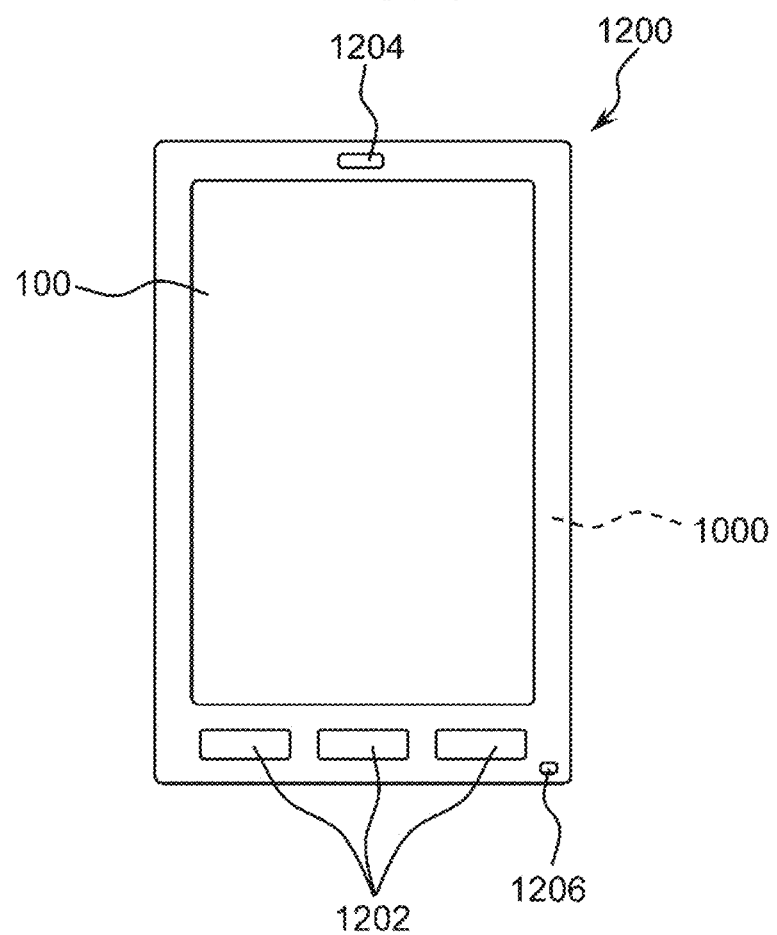
FIG. 6 is a plan view showing a smartphone, which is an electronic device including the magnetic element according to the embodiment.

FIG. 6 is a plan view showing a smartphone, which is an electronic device including the magnetic element according to the embodiment. A smartphone 1200 shown in FIG. 6 includes a plurality of operation buttons 1202, an earpiece 1204, and a mouthpiece 1206. The display portion 100 is disposed between the operation buttons 1202 and the earpiece 1204. The smartphone 1200 is incorporated with the magnetic element 1000 such as an inductor, a noise filter, and a motor.

Figure 7:
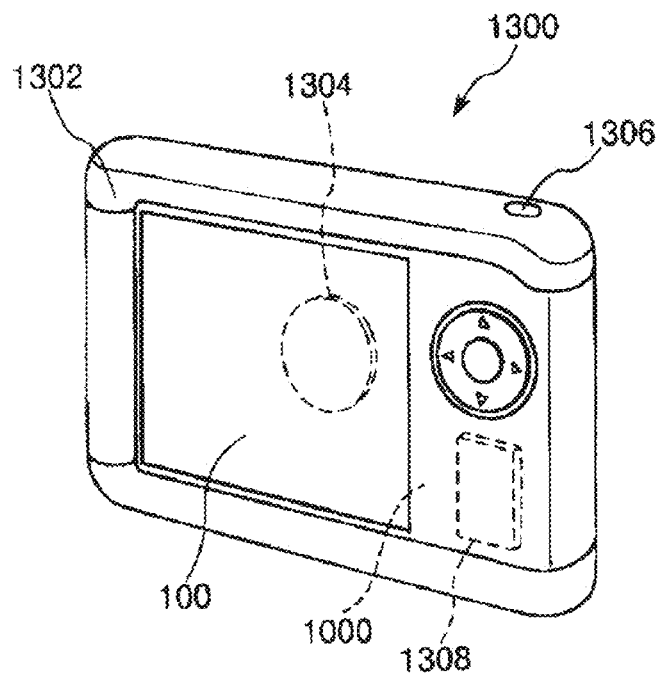
FIG. 7 is a perspective view showing a digital still camera, which is an electronic device including the magnetic element according to the embodiment.

FIG. 7 is a perspective view showing a digital still camera, which is an electronic device including the magnetic element according to the embodiment. A digital still camera 1300 photoelectrically converts an optical image of a subject by an imaging element such as a charge coupled device (CCD) to generate an imaging signal.

The digital still camera 1300 shown in FIG. 7 includes the display portion 100 provided on a rear surface of a case 1302. The display portion 100 functions as a finder on which the subject is displayed as an electronic image. A light receiving unit 1304 including an optical lens, a CCD, and the like is provided on a front surface side of the case 1302, that is, on a back surface side in the drawing.

When a photographer confirms a subject image displayed on the display portion 100 and presses a shutter button 1306, an imaging signal of the CCD at this time is transferred to and stored in a memory 1308. Such a digital still camera 1300 is also incorporated with the magnetic element 1000 such as an inductor or a noise filter.

Examples of the electronic device according to the embodiment include, in addition to the personal computer in FIG. 5, the smartphone in FIG. 6, and the digital still camera in FIG. 7, a mobile phone, a tablet terminal, a watch, ink jet discharge devices such as an ink jet printer, a laptop personal computer, a television, a video camera, a video tape recorder, a car navigation device, a pager, an electronic notebook, an electronic dictionary, a calculator, an electronic game device, a word processor, a workstation, a videophone, a crime prevention television monitor, electronic binoculars, a POS terminal, medical devices such as an electronic thermometer, a blood pressure meter, a blood glucose meter, an electrocardiogram measuring device, an ultrasonic diagnostic device, and an electronic endoscope, a fish finder, various measuring devices, instruments for a vehicle, an aircraft, and a ship, moving body control devices such as an automobile control device, an aircraft control device, a railway vehicle control device, and a ship control device, and a flight simulator.

As described above, such an electronic device includes the magnetic element according to the embodiment. Accordingly, it is possible to exert effects of the magnetic element including a low coercive force and a low core loss, and to achieve high performance of the electronic device.

5. Moving Body

Next, a moving body including the magnetic element according to the present embodiment will be described with reference to FIG. 8.

Figure 8:
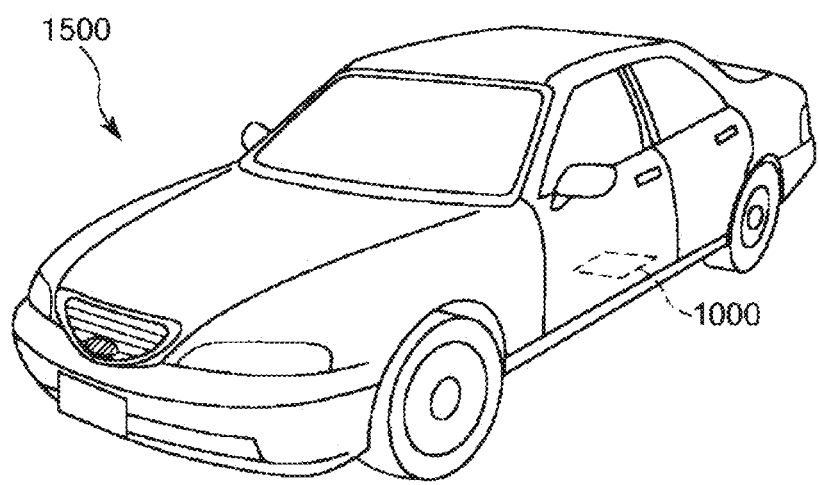
FIG. 8 is a perspective view showing an automobile, which is a moving body including the magnetic element according to the embodiment.

FIG. 8 is a perspective view showing an automobile, which is a moving body including the magnetic element according to the embodiment.

An automobile 1500 is incorporated with the magnetic element 1000. Specifically, the magnetic element 1000 is incorporated in various automobile parts such as a car navigation system, an anti-lock brake system (ABS), an engine control unit, a battery control unit of a hybrid vehicle or an electric vehicle, a vehicle body posture control system, an electronic control unit (ECU) such as an automatic driving system, a driving motor, a generator, and an air conditioning unit.

As described above, such a moving body includes the magnetic element according to the embodiment. Accordingly, it is possible to exert the effects of the magnetic element including a low coercive force and a low core loss, and to achieve high performance of the moving body.

Figure 9:
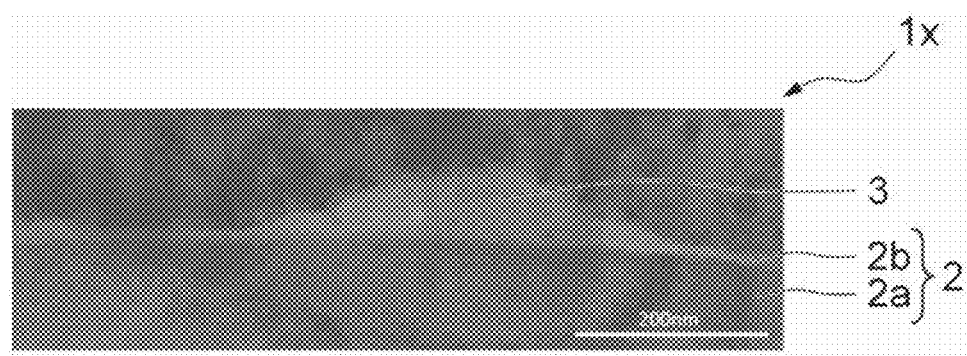
FIG. 9 is an example of an observation image of a cross section of the insulating material-coated soft magnetic powder before a heat treatment obtained by a transmission electron microscope (TEM).

The moving body according to the present embodiment may be, in addition to the automobile shown in FIG. 9, for example, a motorcycle, a bicycle, an aircraft, a helicopter, a drone, a ship, a submarine, a railway, a rocket, and a spacecraft.

The insulating material-coated soft magnetic powder, the dust core, the magnetic element, the electronic device, and the moving body according to the present disclosure have been described above based on the preferred embodiment, but the present disclosure is not limited thereto.

For example, in the above embodiment, a compact such as a dust core has been described as an application example of the insulating material-coated soft magnetic powder according to the present disclosure, but the application example is not limited thereto. The insulating material-coated soft magnetic powder may be applied to a magnetic fluid, and a magnetic device such as a magnetic head and a magnetic shielding sheet.

In addition, the shapes of the dust core and the magnetic element are not limited to those shown in the drawings, and may be any shape.

EXAMPLES

Next, specific examples of the present disclosure will be described.

6. Production of Insulating Material-Coated Soft Magnetic Powder 6.1. Example 1

First, as the core particle 2, a metal powder of an Fe—Si—Cr based alloy produced by a water atomization method was prepared. The metal powder is an Fe-based alloy powder containing Fe as a main component and containing 4.5 mass % of Cr and 3.5 mass % of Si. An average particle diameter of the metal powder was 10 μm. When the metal powder was analyzed, the presence of the oxide film 2b was recognized. The oxide film 2b mainly contained silicon oxide.

An aluminum oxide powder was prepared as the nanoparticles 3. An average particle diameter of the aluminum oxide powder was 15 nm.

Next, the metal power and the aluminum oxide powder were mixed with each other. The addition amount of the aluminum oxide powder with respect to the metal powder was 0.30 mass %. The obtained mixture was charged into a vibration type ball mill device, and was vibrated and stirred. Vibrating and stirring conditions are as shown in Table 1.

Next, a part of the insulating material-coated soft magnetic particle 1x before the heat treatment was set aside for observation to be described later, and the remaining part was subjected to a heat treatment. An electric furnace was used in the heat treatment, the treatment conditions included a heating rate of 5° C./min, a heating temperature of 900° C., and a heating time of 1 hour in an argon gas atmosphere. Then, when the heat treatment was completed, the electric furnace was cooled to 25° C. Accordingly, an insulating material-coated soft magnetic power was obtained.

6.2. Examples 2 to 17

Insulating material-coated soft magnetic powders were obtained in the same manner as in Example 1 except that the production conditions were changed as shown in Table 1 or Table 2. In Examples 14 to 17, a ball medium was not used.

6.3. Example 18

An insulating material-coated soft magnetic powder was obtained in the same manner as in Example 1 except that an insulating film was formed by adhering the nanoparticles to the surface of the core particle by mechanical shear energy using a rotary-blade mixer instead of the vibration type ball mill used in Example 1. In Table 2, "Mechanical shear" is recorded as a method of forming the insulating film.

6.4. Comparative Examples 1 to 3

Insulating material-coated soft magnetic powders were obtained in the same manner as in Example 1 except that the production conditions were changed as shown in Table 2.

6.5. Comparative Example 4

A soft magnetic powder was obtained in the same manner as in Example 1 except that the heat treatment was omitted and the production conditions were changed as shown in Table 2.

6.6. Comparative Example 5

A soft magnetic powder was obtained in the same manner as in Example 1 except that the nanoparticles were not added and the production conditions were changed as shown in Table 2.

7. Evaluation of Insulating Material-coated Soft Magnetic Powder 7.1. Cross Section Observation First, cross-sections of the insulating material-coated soft magnetic powder before the heat treatment and the insulating material-coated soft magnetic power after the heat treatment were observed by using a scanning transmission electron microscope.

FIG. 9 is an example of an observation image of the cross section of the insulating material-coated soft magnetic powder before the heat treatment obtained by a transmission electron microscope (TEM).

As shown in FIG. 9, it is recognized that in the insulating material-coated soft magnetic particle (the insulating material-coated soft magnetic particle 1x) before the heat treatment, the oxide film 2b is present on the surface of the base portion 2a of the core particle 2 and the nanoparticles 3 are present on the surface of the oxide film 2b.

Figure 10:
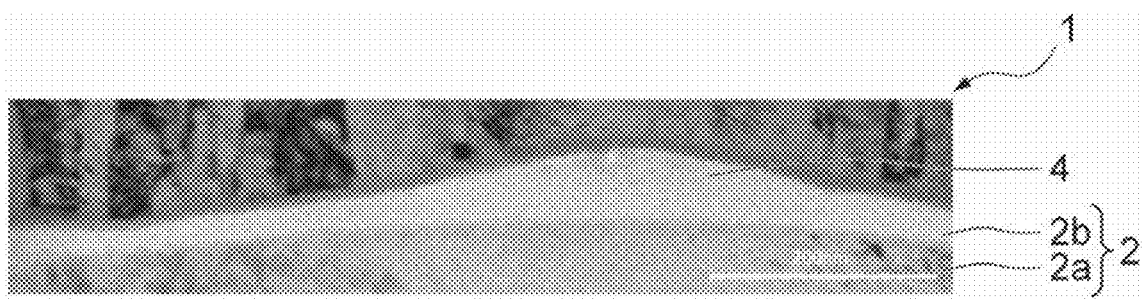
FIG. 10 is an example of an observation image of a cross section of the insulating material-coated soft magnetic powder after the heat treatment obtained by the transmission electron microscope (TEM).

FIG. 10 is an example of an observation image of the cross section of the insulating material-coated soft magnetic powder after the heat treatment obtained by the transmission electron microscope.

As shown in FIG. 10, it is not recognized that in the insulating material-coated soft magnetic powder (the insulating material-coated soft magnetic particle 1) after the heat treatment, the nanoparticles 3 are present in the insulating film 4. Thus, it can be seen that the nanoparticles 3 are melted or sintered by the heat treatment, and the shape of the nanoparticles 3 as particles is not retained. Specifically, in FIG. 10, shading of a region corresponding to the insulating film 4 is uniform as compared with FIG. 9, and it can be considered that almost no nanoparticles 3 are present.

Figure 11:
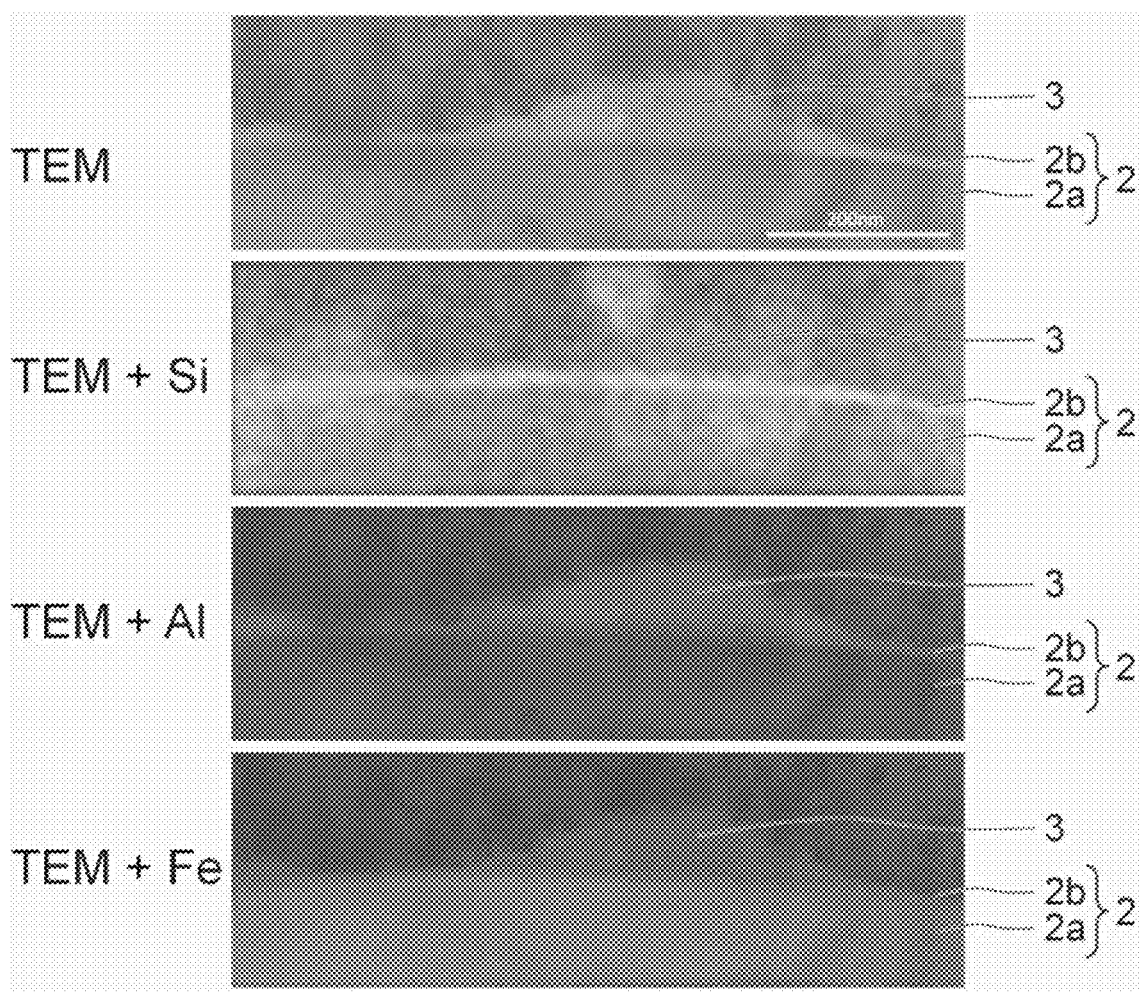
FIG. 11 shows, in parallel, the observation image (TEM image) in FIG. 9, a diagram in which a Si mapping analysis result indicating a concentration of Si atoms is superimposed on the TEM image, a diagram in which an Al mapping analysis result indicating a concentration of Al atoms is superimposed on the TEM image, and a diagram in which an Fe mapping analysis result indicating a concentration of Fe atoms is superimposed on the TEM image.

FIG. 11 shows, in parallel, the observation image (TEM image) in FIG. 9, a diagram in which a Si mapping analysis result indicating a concentration of Si atoms is superimposed on the TEM image, a diagram in which an Al mapping analysis result indicating a concentration of Al atoms is superimposed on the TEM image, and a diagram in which an Fe mapping analysis result indicating a concentration of Fe atoms is superimposed on the TEM image.

In the TEM image in FIG. 11, the vicinity of a surface of a cross section of the particle is enlarged. In FIG. 11, the core particle 2 including the base portion 2a and the oxide film 2b located on the surface of the base portion 2a, and the nanoparticles 3 located on the surface of the core particle 2 are recognized.

Based on the Si mapping analysis result shown in FIG. 11, it is recognized that Si is segregated in the oxide film 2b. In the Si mapping analysis result, a relatively light color region indicates a region having a high Si concentration. Thus, it is presumed that the oxide film 2b contains a large amount of silicon oxide. In addition, based on the Al mapping analysis result shown in FIG. 11, it is recognized that Al is segregated in the nanoparticles 3. In the Al mapping analysis result, a relatively light color region indicates a region having a high Al concentration. Thus, it is presumed that the nanoparticles 3 contain a large amount of aluminum oxide. In addition, based on the Fe mapping analysis result shown in FIG. 11, it can be seen that an Fe concentration is high in the base portion 2a.

In FIG. 11, the region having a high Si concentration and the region having a high Al concentration are exclusive. Therefore, it is recognized that the silicon oxide contained in the oxide film 2b and the aluminum oxide contained in the nanoparticles 3 are exclusively distributed without being mixed with each other in the insulating material-coated soft magnetic powder before the heat treatment.

Figure 12:
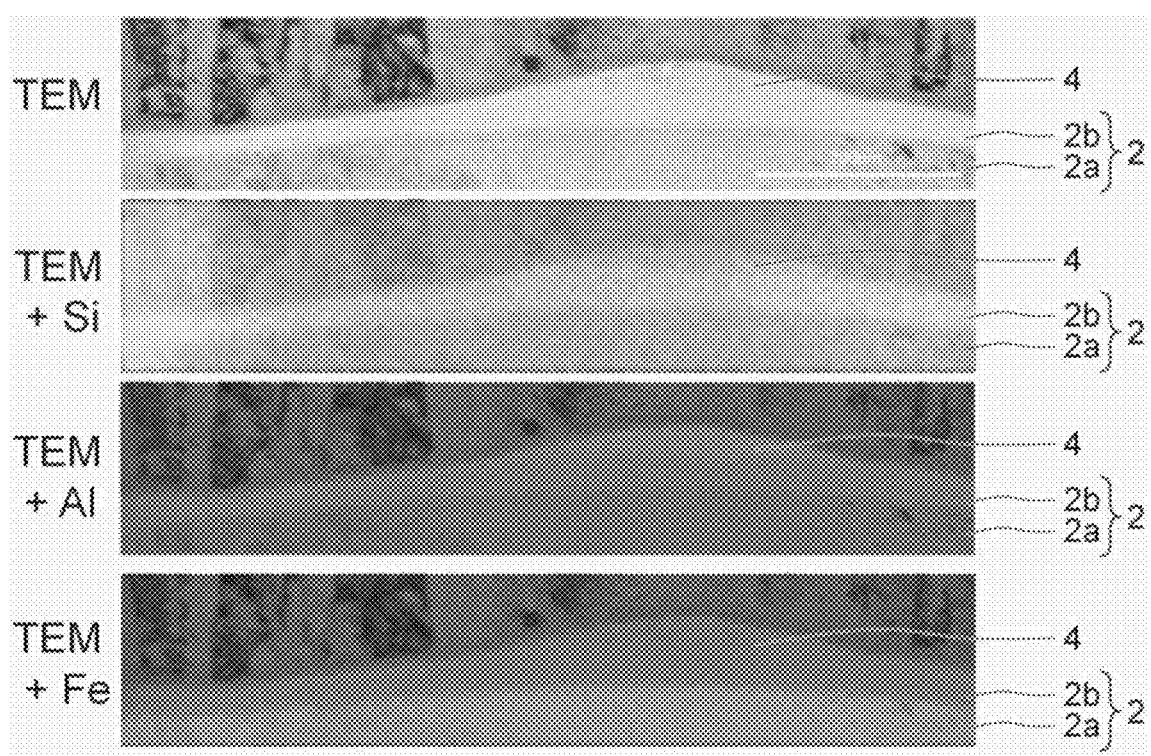
FIG. 12 shows, in parallel, the observation image (TEM image) in FIG. 10, a diagram in which a Si mapping analysis result indicating a concentration of Si atoms is superimposed on the TEM image, a diagram in which an Al mapping analysis result indicating a concentration of Al atoms is superimposed on the TEM image, and a diagram in which an Fe mapping analysis result indicating a concentration of Fe atoms is superimposed on the TEM image.

FIG. 12 shows, in parallel, the observation image (TEM image) in FIG. 10, a diagram in which a Si mapping analysis result indicating a concentration of Si atoms is superimposed on the TEM image, a diagram in which an Al mapping analysis result indicating a concentration of Al atoms is superimposed on the TEM image, and a diagram in which an Fe mapping analysis result indicating a concentration of Fe atoms is superimposed on the TEM image.

In the TEM image in FIG. 12, the vicinity of a surface of a cross section of the particle is enlarged. In FIG. 12, the core particle 2 including the base portion 2a and the oxide film 2b located on the surface of the base portion 2a, and the insulating film 4 located on the surface of the core particle 2 are recognized.

Based on the Si mapping analysis result shown in FIG. 12, it can be seen that a light color region linearly extends to correspond to the oxide film 2b. Therefore, it is recognized that Si is segregated in the oxide film 2b. Thus, it is presumed that the oxide film 2b contains a large amount of silicon oxide. The linear region has a wide width in a thickness direction.

Meanwhile, based on the Al mapping analysis result shown in FIG. 12, it is recognized that Al is segregated in the insulating film 4. Thus, it is presumed that the insulating film 4 contains a large amount of aluminum oxide. An overlap between a region where Si is distributed and a region where Al is distributed is recognized. Therefore, it is recognized that the silicon oxide contained in the oxide film 2b and the aluminum oxide contained in the insulating film 4 are mutually diffused by the heat treatment.

In addition, based on the Fe mapping analysis result shown in FIG. 12, it can be seen that the Fe concentration is high in the base portion 2a.

The observation as described above was performed on the insulating material-coated soft magnetic powders of Examples and the insulating material-coated soft magnetic powders and soft magnetic powders of Comparative Examples. When the oxide contained in the oxide film 2b and the ceramic contained in the insulating film 4 are mutually diffused at the interface between the oxide film 2b and the insulating film 4, "Yes" is recorded in Tables 1 and 2. When the mutual diffusion is not recognized, "No" is recorded in Tables 1 and 2.

In addition, when the nanoparticles 3 remain on the insulating film 4 after the heat treatment, "Yes" is recorded in Tables 1 and 2. When the remain of the nanoparticles 3 on the insulating film 4 after the heat treatment is not recognized, "No" is recorded in Tables 1 and 2.

7.2. Coercive Force

Coercive forces of the insulating material-coated soft magnetic powders of Examples and the insulating material-coated soft magnetic powders and the soft magnetic powders of Comparative Examples were measured using a VSM system TM-VSM1230-MHHL manufactured by Tamagawa Seisakusho Co., Ltd. serving as a magnetization measuring device. Then, the measured coercive forces were evaluated in light of the following criteria. Evaluation results are shown in Tables 1 and 2. Hereinafter, the insulating material-coated soft magnetic powders of Examples may also be simply referred to as powders of Examples, and the insulating material-coated soft magnetic powders and the soft magnetic powders of Comparative Examples may also be simply referred to as powders of Comparative Examples.

A: the coercive force is less than 3.0 [Oe]
    B: the coercive force is 3.0 [Oe] or more and less than 3.5 [Oe]
    C: the coercive force is 3.5 [Oe] or more and less than 5.0 [Oe]
    D: the coercive force is 5.0 [Oe] or more and less than 7.0 [Oe]
    E: the coercive force is 7.0 [Oe] or more and less than 10.0 [Oe]
    F: the coercive force is 10.0 [Oe] or more 7.3. Dielectric Breakdown Voltage Dielectric breakdown voltages of the powders of Examples and Comparative Examples were measured by the following method. Values of the dielectric breakdown voltages are shown in Tables 1 and 2.

First, an alumina cylinder having an inner diameter of 8 mm was filled with 2 g of each of the powders of Examples and Comparative Examples, and brass electrodes were disposed at both ends of the cylinder. Then, in an environment of 25° C., a voltage of 50 V was applied between the electrodes for 2 seconds while applying a pressure of 40 kg/cm² between the electrodes at both ends of the cylinder by using a digital force gauge. At this time, electrical resistance between the electrodes was measured with a digital multimeter to confirm the presence or absence of a dielectric breakdown.

Next, the voltage applied between the electrodes was boosted to 100 V and held for 2 seconds, and the electrical resistance between the electrodes at this time was measured to confirm the presence or absence of the dielectric breakdown.

In addition, the voltage applied between the electrodes was boosted from 150 V by 50 V at each time, and the electrical resistance between the electrodes was measured at each time to confirm the presence or absence of the dielectric breakdown. The voltage was boosted by 50 V at each time, and the measurement of the electrical resistance was performed until the dielectric breakdown occurred. A maximum voltage applied between the electrodes was 1000 V, and when the dielectric breakdown was not occur at 1000 V, the measurement was ended at 1000 V.

The above series of operations were performed three times while updating the powder each time. Then, a lowest voltage value at which the dielectric breakdown occurred in the three times was set as the dielectric breakdown voltage.

7.4. Filling Property

For the powders of Examples and Comparative Examples, a filling rate was evaluated for the filling property as an index of moldability at the time of compact molding. Evaluation results are shown in Tables 1 and 2.

First, an apparent density of each of the powders of Examples and Comparative Examples was measured. Specifically, the measurement was performed base on a metal powder-apparent density measuring method specified in JIS Z 2504:2012.

Next, a true density of each of the powders of Examples and Comparative Examples was measured by a constant volume expansion method. Units of the apparent density and the true density are g/cm³.

Then, a value obtained by dividing the apparent density by the true density was calculated as the filling rate [%], and each filling rate was evaluated as the filling property in light of the following criteria.

A: the filling rate is 40% or more
    B: the filling rate is 35% or more and less than 40%
    C: the filling rate is 30% or more and less than 35%
    D: the filling rate is less than 30%
    E: sintering occurs in the powder and the measurement cannot be performed 7.5. Magnetic Permeability A ring-shaped magnetic core used for a choke coil, as a so-called toroidal core, was produced by using each of the powders of Examples and Comparative Examples, and the magnetic permeability thereof was measured. Specifically, a methyl ethyl ketone solution of an epoxy-based resin as a binder was added to the powder such that a solid content was 2.0 mass %. The methyl ethyl ketone solution and the powder were mixed with each other and dried to form a lump. The lump was crushed, and then was press-molded into a ring shape having an outer diameter of 14 mm, an inner diameter of 7 mm, and a thickness of 3 mm at a molding pressure of 3000 kgf/cm². Next, heating was performed at 150° C. for 30 minutes to obtain a toroidal core. The magnetic permeability at a frequency of 100 kHz was measured for the toroidal coil by using a 4294A Precision Impedance Analyzer manufactured by Agilent Technologies, Inc. The measured magnetic permeability was evaluated in light of the following evaluation criteria. Evaluation results are shown in Tables 1 and 2.

A: the magnetic permeability is 29 or more.
    B: the magnetic permeability is 28 or more and less than 29.
    C: the magnetic permeability is 27 or more and less than 28.
    D: the magnetic permeability is less than 27.

7.6. Specific Surface Area

The specific surface area S of each of the powders of Examples and Comparative Examples was measured using a BET specific surface area measuring device HM1201-010 manufactured by MOUNTECH Co., Ltd.

When a specific surface area of a true spherical particle calculated based on an average particle diameter d of the power and the true density p of the core particle was $\{6/(d \cdot \rho)\}$, a multiple k of the specific surface area S with respect to the specific surface area $\{6/(d \cdot \rho)\}$ of the true spherical particle was calculated. Calculation results are shown in Tables 1 and 2.

TABLE 1

|  |  |  |  | Example 1 | Example 2 | Example 3 | Example 4 | Example 5 | Example 6 |
|---|---|---|---|---|---|---|---|---|---|
| Production condition | Core particle | Base portion (soft magnetic material) | — | Fe-Si-Cr-based alloy | | | | | |
|  |  | Oxide contained in oxide film | — | SiO$_2$ and Cr$_2$O$_3$ | | | | | |
|  |  | Average particle diameter | μm | 10 | | | | | |
|  |  | Thickness of oxide film | nm | 40 | 40 | 40 | 80 | 40 | 40 |
|  | Nanoparticles | Type | — | Al$_2$O$_3$ | Al$_2$O$_3$ | Al$_2$O$_3$ | Al$_2$O$_3$ | Al$_2$O$_3$ | Al$_2$O$_3$ |
|  |  | Average particle diameter | nm | 15 | 2 | 8 | 8 | 8 | 8 |
|  |  | Addition amount | mass % | 0.30 | 0.20 | 0.50 | 0.50 | 0.20 | 0.20 |
|  |  | Surface treatment | — | No | No | No | No | No | Yes |
|  | Formation of insulating film | Diameter of ball medium | mm | 1 | 1 | 1 | 1 | 1 | 1 |
|  |  | Treatment time | Minute | 15 | 15 | 15 | 15 | 15 | 15 |
|  |  | Frequency | Hz | 50 | 50 | 50 | 50 | 50 | 50 |
|  | Heat treatment | Atmosphere gas | — | Ar | Ar | Ar | Ar | Ar | H$_2$ |
|  |  | Heating temperature | ° C. | 900 | 900 | 800 | 900 | 900 | 1100 |
|  |  | Heating time | Hour | 1 | 4 | 8 | 1 | 10 | 8 |
|  | Particle diameter ratio of nanoparticles to core particle |  | — | 1/667 | 1/5000 | 1/1250 | 1/1250 | 1/1250 | 1/1250 |
|  | Diffusion |  | — | Yes | Yes | Yes | Yes | Yes | Yes |
|  | Remain of core particle |  | — | No | No | No | No | No | No |
|  | Thickness of insulating film |  | nm | 150 | 100 | 250 | 225 | 80 | 20 |
| Evaluation result | Coercive force |  | — | A | A | B | A | A | A |
|  | Dielectric breakdown voltage |  | V | 700 | 1000 | 850 | 750 | 1000 | 850 |
|  | Filling property |  | — | B | A | B | B | A | B |
|  | Magnetic permeability |  | — | A | A | B | B | A | B |
|  | Multiple of specific surface area |  | — | 2.8 | 2.4 | 2.6 | 2.7 | 2.3 | 2.6 |

|  |  |  |  | Example 7 | Example 8 | Example 9 | Example 10 | Example 11 | Example 12 |
|---|---|---|---|---|---|---|---|---|---|
| Production condition | Core particle | Base portion (soft magnetic material) | — | Fe-Si-Cr-based alloy | | | | | |
|  |  | Oxide contained in oxide film | — | SiO$_2$ and Cr$_2$O$_3$ | | | | | |
|  |  | Average particle diameter | μm | 10 | | | | | |
|  |  | Thickness of oxide film | nm | 40 | 60 | 40 | 50 | 50 | 40 |
|  | Nanoparticles | Type | — | Al$_2$O$_3$ | Al$_2$O$_3$ | SiO$_2$ | ZrO$_2$ | BN | Al$_2$O$_3$ |
|  |  | Average particle diameter | nm | 8 | 20 | 8 | 20 | 10 | 10 |
|  |  | Addition amount | mass % | 0.20 | 0.50 | 0.50 | 0.40 | 0.40 | 0.30 |
|  |  | Surface treatment | — | No | No | No | No | No | No |
|  | Formation of insulating film | Diameter of ball medium | mm | 1 | 1 | 1 | 0.5 | 1 | 3 |
|  |  | Treatment time | Minute | 15 | 15 | 15 | 15 | 15 | 15 |
|  |  | Frequency | Hz | 50 | 50 | 50 | 50 | 50 | 50 |
|  | Heat treatment | Atmosphere gas | — | Ar | H$_2$ | H$_2$ | H$_2$ | Ar | Ar |
|  |  | Heating temperature | ° C. | 1000 | 1000 | 1000 | 1000 | 1000 | 1000 |
|  |  | Heating time | Hour | 8 | 8 | 4 | 4 | 4 | 3 |
|  | Particle diameter ratio of nanoparticles to core particle |  | — | 1/1250 | 1/500 | 1/1250 | 1/500 | 1/1000 | 1/1000 |
|  | Diffusion |  | — | Yes | Yes | Yes | Yes | Yes | Yes |
|  | Remain of core particle |  | — | No | Yes | No | No | No | No |
|  | Thickness of insulating film |  | nm | 50 | 275 | 290 | 175 | 120 | 160 |
| Evaluation result | Coercive force |  | — | A | A | A | B | B | B |
|  | Dielectric breakdown voltage |  | V | 650 | 750 | 700 | 750 | 700 | 700 |
|  | Filling property |  | — | B | B | B | B | A | A |
|  | Magnetic permeability |  | — | B | B | B | B | A | A |
|  | Multiple of specific surface area |  | — | 2.9 | 3.1 | 2.9 | 3.2 | 1.9 | 2.4 |

TABLE 2

|  |  |  |  | Example 13 | Example 14 | Example 15 | Example 16 | Example 17 | Example 18 |
|---|---|---|---|---|---|---|---|---|---|
| Production condition | Core particle | Base portion (soft magnetic material) | — | Fe-Si-Cr-based alloy | | | | | |

TABLE 2-continued

|  |  |  | | | | | | | |
|---|---|---|---|---|---|---|---|---|---|
| | | Oxide contained in oxide film | — | | | $SiO_2$ and $Cr_2O_3$ | | | |
| | | Average particle diameter | μm | | | 10 | | | |
| | | Thickness of oxide film | nm | 40 | 40 | 40 | 40 | 40 | 40 |
| | Nanoparticles | Type | — | $Al_2O_3$ | $Al_2O_3$ | $Al_2O_3$ | $Al_2O_3$ | $Al_2O_3$ | $Al_2O_3$ |
| | | Average particle diameter | nm | 15 | 15 | 15 | 15 | 15 | 12 |
| | | Addition amount | mass % | 0.30 | 0.30 | 0.30 | 0.30 | 0.30 | 0.75 |
| | | Surface treatment | — | No | No | No | No | No | No |
| | Formation of insulating film | Diameter of ball medium | mm | No | No | No | No | No | Mechanical shear |
| | | Processing time | Minute | 30 | 30 | 30 | 30 | 30 | |
| | | Frequency | Hz | 20 | 5 | 30 | 50 | 80 | |
| | Heat treatment | Atmosphere gas | — | Ar | Ar | Ar | Ar | Ar | $H_2$ |
| | | Heating tempter | ° C. | 900 | 900 | 900 | 900 | 900 | 1000 |
| | | Heating time | Hour | 1 | 1 | 1 | 1 | 1 | 4 |
| | Particle diameter ratio of nanoparticles to core particle | | — | 1/667 | 1/667 | 1/667 | 1/667 | 1/667 | 1/833 |
| | Diffusion | | — | Yes | Yes | Yes | Yes | Yes | Yes |
| | Remain of core particle | | — | No | No | No | No | No | No |
| | Thickness of insulating film | | nm | 150 | 50 | 150 | 150 | 150 | 150 |
| Evaluation result | Coercive force | | — | A | A | A | A | B | D |
| | Dielectric breakdown voltage | | V | 700 | 600 | 700 | 700 | 700 | 600 |
| | Filling property | | — | B | B | B | B | B | B |
| | Magnetic permeability | | — | A | A | A | A | A | C |
| | Multiple of specific surface area | | — | 2.8 | 3.1 | 2.7 | 2.6 | 2.5 | 2.2 |

|  |  |  | | Comparative Example 1 | Comparative Example 2 | Comparative Example 3 | Comparative Example 4 | Comparative Example 5 |
|---|---|---|---|---|---|---|---|---|
| Production condition | Core particle | Base portion (soft magnetic material) | — | | | Fe-Si-Cr-based alloy | | |
| | | Oxide contained in oxide film | — | | | $SiO_2$ and $Cr_2O_3$ | | |
| | | Average particle diameter | μm | | | 10 | | |
| | | Thickness of oxide film | nm | 40 | 40 | 50 | 60 | 40 |
| | Nanoparticles | Type | — | $Al_2O_3$ | $Al_2O_3$ | $Al_2O_3$ | $Al_2O_3$ | — |
| | | Average particle diameter | nm | 18 | 12 | 12 | 8 | — |
| | | Addition amount | mass % | 1.2 | 0.05 | 0.59 | 0.54 | — |
| | | Surface treatment | — | No | No | No | No | — |
| | Formation of insulating film | Diameter of ball medium | mm | 10 | 10 | 10 | 10 | — |
| | | Processing time | Minute | 15 | 15 | 15 | 15 | — |
| | | Frequency | Hz | 15 | 15 | 15 | 15 | — |
| | Heat treatment | Atmosphere gas | — | $H_2$ | $H_2$ | $H_2$ | — | — |
| | | Heating tempter | ° C. | 1000 | 1000 | 500 | — | — |
| | | Heating time | Hour | 4 | 4 | 4 | — | — |
| | Particle diameter ratio of nanoparticles to core particle | | — | 1/556 | 1/833 | 1/833 | 1/1250 | — |
| | Diffusion | | — | Yes | Yes | No | No | — |
| | Remain of core particle | | — | No | No | Yes | Yes | — |
| | Thickness of insulating film | | nm | 380 | 2 | 290 | 275 | — |
| Evaluation result | Coercive force | | — | A | A | E | F | B |
| | Dielectric breakdown voltage | | V | 1000 | 100 | 300 | 300 | 0 |
| | Filling property | | — | E | B | B | A | E |
| | Magnetic permeability | | — | D | C | C | C | A |
| | Multiple of specific surface area | | — | 3.8 | 3.7 | 3.3 | 3.6 | 3.5 |

As is clear from Tables 1 and 2, it is recognized that the powders of Examples have a low coercive force and a high insulating property between the particles even when the powders are subjected to a heat treatment at a high temperature, as compared with the powders of Comparative Examples.

In addition, it is recognized that, in the formation of the insulating film, when not a method involving mechanical shear energy but a method using a vibration type ball mill is adopted, the coercive force is likely to decrease particularly due to the heat treatment. In the method involving mechanical shear energy, since a processing strain applied during the film formation is large, it is considered that the coercive force is unlikely to decrease due to the heat treatment. When a vibration type ball mill is used, good insulation characteristics are obtained under both conditions in which the ball medium is not charged and conditions in which the diameters of the ball media are different.

In addition, it is recognized that an appropriate heat treatment causes mutual diffusion between the oxide contained in the oxide film of the core particle and the ceramic contained in the insulating film, further increases the insulating property, and reduces the specific surface area of the powder.

It is confirmed that, when the specific surface area of the powder is expressed as a multiple of the specific surface area of the true spherical particle, the filling property is improved while maintaining the insulation property between the particles by reducing the multiple to some extent.

An insulating material-coated soft magnetic powder was obtained in the same manner as the above by using, instead of the Fe—Si—Cr-based alloy powder, a Sendust (Fe—Si—Al-based alloy) powder as the metal powder. Then, the obtained insulating material-coated soft magnetic powder was evaluated in the same manner as the above. As a result, evaluation results showing the same tendency as that in a case where the Fe—Si—Cr-based alloy powder is used were obtained.

What is claimed is:

1. An insulating material-coated soft magnetic powder including a plurality of individual particles, each individual particle comprising:
   a core particle that includes a base portion containing a soft magnetic material containing Fe as a main component and at least one of Si, Cr, and Al, and that includes an oxide film provided on a surface of the base portion and containing an oxide of at least one of Si, Cr, and Al; and
   an insulating film that is provided on a surface of the core particle and that contains a ceramic,
   wherein a thickness of the insulating film is 5 nm or more and 300 nm or less as measured from an interface between the insulating film and the oxide film using a scanning transmission electron microscope where an integrated state of the oxide film and the insulating film are confirmed,
   the oxide contained in the oxide film and the ceramic contained in the insulating film are mutually diffused at the interface between the oxide film and the insulating film,
   the insulating film is formed from melted or sintered insulating particles that collectively define a layer that surrounds the oxide film, and
   a majority of the insulating film is occupied by the insulating particles in a melted or sintered state that do not retain a particle shape rather than by insulating particles in the form of a particle that are not melted or sintered.

2. The insulating material-coated soft magnetic powder according to claim 1, wherein
   the ceramic contains at least one of aluminum oxide, silicon oxide, zirconium oxide, boron nitride, and silicon nitride.

3. The insulating material-coated soft magnetic powder according to claim 1, wherein
   each individual particle has an average particle diameter that is 1.0 μm or more and 50.0 μm or less.

4. The insulating material-coated soft magnetic powder according to claim 3, wherein $$S = k\{6/(d \cdot \rho)\} \quad \text{(A), and}$$

$$1.0 \leq k \leq 3.2 \quad \text{(B),}$$

where $S$ [m²/g] is a specific surface area of each individual particle, $\rho$ [g/m³] s a true density of the core particles, and d [m] is the average particle diameter of the individual particles.

5. The insulating material-coated soft magnetic powder according to claim 1, wherein
   a coercive force is 7.0 [Oe] or less.

6. A dust core comprising:
   the insulating material-coated soft magnetic powder according to claim 1.

7. A magnetic element comprising:
   the dust core according to claim 6.

8. An electronic device comprising:
   the magnetic element according to claim 7.

9. A moving body comprising:
   the magnetic element according to claim 7.

10. The insulating material-coated soft magnetic powder according to claim 1, wherein the soft magnetic material includes an Fe—Si—B—Nb based alloy.

* * * * *